(12) United States Patent
Agnoli et al.

(10) Patent No.: US 7,970,926 B2
(45) Date of Patent: *Jun. 28, 2011

(54) SYNCHRONIZED TRANSMISSION OF AUDIO AND VIDEO DATA FROM A COMPUTER TO A CLIENT VIA AN INTERFACE

(75) Inventors: Giovanni M. Agnoli, San Mateo, CA (US); Andrew Yanowitz, Ben Lomond, CA (US); John O. Abt, Grass Valley, CA (US); Samuel R. Bowman, Colfax, CA (US); James A. Delwiche, Grass Valley, CA (US); Jeffrey C. Dillon, Auburn, CA (US)

(73) Assignee: Apple Inc., Cupertino, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/079,832

(22) Filed: Mar. 28, 2008

(65) Prior Publication Data

US 2008/0250469 A1   Oct. 9, 2008

Related U.S. Application Data

(63) Continuation of application No. 10/746,283, filed on Dec. 23, 2003, now Pat. No. 7,353,284.

(60) Provisional application No. 60/478,336, filed on Jun. 13, 2003.

(51) Int. Cl.
G06F 15/16 (2006.01)
G06F 15/173 (2006.01)

(52) U.S. Cl. ........ 709/233; 709/218; 709/224; 709/232; 709/235

(58) Field of Classification Search .................. 709/224, 709/231, 232, 249; 370/229, 233, 235, 389, 370/465

See application file for complete search history.

(56) References Cited

U.S. PATENT DOCUMENTS

| 4,156,798 | A | 5/1979 | Doelz |
| 4,194,113 | A | 3/1980 | Fulks et al. |
| 4,616,359 | A | 10/1986 | Fontenot |
| 5,014,262 | A | 5/1991 | Harshavardhana |

(Continued)

FOREIGN PATENT DOCUMENTS

| EP | 1 085 706 | 10/2002 |
| WO | WO 00/41400 | 7/2000 |

OTHER PUBLICATIONS

Bregni et al., Jitter Testing Technique and Results at VC-4 Desynchronizer Output of SDH Equipment, IEEE International Conference on Communications, vol. 3, pp. 1407-1410, May 12, 1994.

(Continued)

Primary Examiner — Quang N. Nguyen
(74) Attorney, Agent, or Firm — Gazdzinski & Associates, PC

(57) ABSTRACT

A method for controlling data transmission between a computer and a video client via an interface, the method comprising: the computer polling the interface a first time to determine the size of the buffer on the interface; receiving a first buffer size value from the interface; sending a plurality of frames of video and audio data to the buffer on the interface such that a delay period exists between the sending of each frame; the computer polling the interface a second time to determine buffer size after the frames are sent to the interface; receiving a second buffer size value from the interface; and modifying the amount of time between the transmission of frames.

40 Claims, 12 Drawing Sheets

U.S. PATENT DOCUMENTS

| | | |
|---|---|---|
| 5,243,596 A | 9/1993 | Port et al. |
| 5,274,631 A | 12/1993 | Bhardwaj |
| 5,297,139 A | 3/1994 | Okura et al. |
| 5,321,812 A | 6/1994 | Benedict et al. |
| 5,343,461 A | 8/1994 | Barton et al. |
| 5,394,556 A | 2/1995 | Oprescu |
| 5,406,643 A | 4/1995 | Burke et al. |
| 5,452,330 A | 9/1995 | Goldstein |
| 5,490,250 A | 2/1996 | Reschke et al. |
| 5,490,253 A | 2/1996 | Laha et al. |
| 5,495,481 A | 2/1996 | Duckwall |
| 5,524,254 A | 6/1996 | Morgan et al. |
| 5,539,390 A | 7/1996 | Nagano et al. |
| 5,541,670 A | 7/1996 | Hanai |
| 5,568,487 A | 10/1996 | Sitbon et al. |
| 5,568,641 A | 10/1996 | Nelson et al. |
| 5,583,922 A | 12/1996 | Davis et al. |
| 5,621,659 A | 4/1997 | Matsumoto et al. |
| 5,630,173 A | 5/1997 | Oprescu |
| 5,632,016 A | 5/1997 | Hoch et al. |
| 5,640,595 A | 6/1997 | Baugher et al. |
| 5,642,515 A | 6/1997 | Jones et al. |
| 5,654,657 A | 8/1997 | Pearce |
| 5,684,715 A | 11/1997 | Palmer |
| 5,701,476 A | 12/1997 | Fenger |
| 5,701,492 A | 12/1997 | Wadsworth et al. |
| 5,706,278 A | 1/1998 | Robillard et al. |
| 5,712,834 A | 1/1998 | Nagano et al. |
| 5,719,862 A | 2/1998 | Lee et al. |
| 5,754,765 A | 5/1998 | Danneels et al. |
| 5,764,930 A | 6/1998 | Staats |
| 5,784,648 A | 7/1998 | Duckwall |
| 5,802,048 A | 9/1998 | Duckwall |
| 5,802,057 A | 9/1998 | Duckwall et al. |
| 5,802,365 A | 9/1998 | Kathail et al. |
| 5,805,073 A | 9/1998 | Nagano et al. |
| 5,805,822 A | 9/1998 | Long et al. |
| 5,809,331 A | 9/1998 | Staats et al. |
| 5,819,115 A | 10/1998 | Hoese et al. |
| 5,826,027 A | 10/1998 | Pedersen et al. |
| 5,832,298 A | 11/1998 | Sanchez et al. |
| 5,835,761 A | 11/1998 | Ishii et al. |
| 5,845,152 A | 12/1998 | Anderson et al. |
| 5,867,730 A | 2/1999 | Leyda |
| 5,875,301 A | 2/1999 | Duckwall et al. |
| 5,877,812 A * | 3/1999 | Krause et al. ............ 370/465 |
| 5,923,663 A | 7/1999 | Bontemps et al. |
| 5,930,480 A | 7/1999 | Staats |
| 5,935,208 A | 8/1999 | Duckwall et al. |
| 5,938,764 A | 8/1999 | Klein |
| 5,940,600 A | 8/1999 | Staats et al. |
| 5,954,796 A | 9/1999 | McCarty et al. |
| 5,968,152 A | 10/1999 | Staats |
| 5,970,052 A | 10/1999 | Lo et al. |
| 5,987,605 A | 11/1999 | Hill et al. |
| 5,991,842 A | 11/1999 | Takayama |
| 6,006,275 A | 12/1999 | Picazo et al. |
| 6,009,480 A | 12/1999 | Pleso |
| 6,032,202 A | 2/2000 | Lea et al. |
| 6,032,261 A | 2/2000 | Hulyalkar |
| 6,038,234 A | 3/2000 | LaFollette et al. |
| 6,038,625 A | 3/2000 | Ogino et al. |
| 6,070,187 A | 5/2000 | Subramaniam et al. |
| 6,073,206 A | 6/2000 | Piwonka et al. |
| 6,091,726 A | 7/2000 | Crivellari et al. |
| 6,115,764 A | 9/2000 | Chisholm et al. |
| 6,122,248 A | 9/2000 | Murakoshi et al. |
| 6,131,129 A | 10/2000 | Ludtke et al. |
| 6,131,134 A | 10/2000 | Huang et al. |
| 6,131,163 A | 10/2000 | Wiegel |
| 6,133,938 A | 10/2000 | James |
| 6,138,163 A | 10/2000 | Nam et al. |
| 6,138,196 A | 10/2000 | Takayama et al. |
| 6,141,702 A | 10/2000 | Ludtke et al. |
| 6,141,767 A | 10/2000 | Hu et al. |
| 6,145,018 A | 11/2000 | LaFollette et al. |
| 6,157,972 A | 12/2000 | Newman et al. |
| 6,160,796 A | 12/2000 | Zou |
| 6,167,532 A | 12/2000 | Wisecup |
| 6,173,327 B1 | 1/2001 | De Borst et al. |
| 6,188,700 B1 | 2/2001 | Kato et al. |
| 6,192,189 B1 | 2/2001 | Fujinami et al. |
| 6,199,119 B1 | 3/2001 | Duckwall et al. |
| 6,202,210 B1 | 3/2001 | Ludtke |
| 6,212,171 B1 | 4/2001 | LaFollette et al. |
| 6,212,633 B1 | 4/2001 | Levy et al. |
| 6,219,697 B1 | 4/2001 | Lawande et al. |
| 6,226,680 B1 | 5/2001 | Boucher et al. |
| 6,233,615 B1 | 5/2001 | Van Loo |
| 6,233,624 B1 | 5/2001 | Hyder et al. |
| 6,243,778 B1 | 6/2001 | Fung et al. |
| 6,247,063 B1 | 6/2001 | Ichimi et al. |
| 6,247,083 B1 | 6/2001 | Hake et al. |
| 6,253,114 B1 | 6/2001 | Takihara |
| 6,253,255 B1 | 6/2001 | Hyder et al. |
| 6,256,059 B1 | 7/2001 | Fichtner |
| 6,260,063 B1 | 7/2001 | Ludtke et al. |
| 6,266,334 B1 | 7/2001 | Duckwall |
| 6,266,344 B1 | 7/2001 | Fujimori et al. |
| 6,266,701 B1 | 7/2001 | Sridhar et al. |
| 6,275,889 B1 | 8/2001 | Saito |
| 6,282,597 B1 | 8/2001 | Kawamura |
| 6,292,840 B1 | 9/2001 | Blomfield Brown et al. |
| 6,295,479 B1 | 9/2001 | Shima et al. |
| 6,298,057 B1 | 10/2001 | Guy et al. |
| 6,308,222 B1 | 10/2001 | Krueger et al. |
| 6,311,228 B1 | 10/2001 | Ray |
| 6,314,461 B2 | 11/2001 | Duckwall et al. |
| 6,330,286 B1 | 12/2001 | Lyons et al. |
| 6,343,321 B2 | 1/2002 | Patki et al. |
| 6,345,315 B1 | 2/2002 | Mishra |
| 6,347,362 B1 | 2/2002 | Schoinas et al. |
| 6,353,868 B1 | 3/2002 | Takayama et al. |
| 6,356,558 B1 | 3/2002 | Hauck et al. |
| 6,363,085 B1 | 3/2002 | Samuels |
| 6,373,821 B2 | 4/2002 | Staats |
| 6,385,679 B1 | 5/2002 | Duckwall et al. |
| 6,405,247 B1 | 6/2002 | Lawande et al. |
| 6,411,628 B1 | 6/2002 | Hauck et al. |
| 6,418,150 B1 | 7/2002 | Staats |
| 6,425,019 B1 | 7/2002 | Tateyama et al. |
| 6,426,962 B1 | 7/2002 | Cabezas et al. |
| 6,442,630 B1 | 8/2002 | Takayama et al. |
| 6,446,116 B1 | 9/2002 | Burridge |
| 6,446,142 B1 | 9/2002 | Shima et al. |
| 6,452,975 B1 | 9/2002 | Hannah |
| 6,457,086 B1 | 9/2002 | Duckwall |
| 6,466,982 B1 | 10/2002 | Ruberg |
| 6,496,862 B1 | 12/2002 | Akatsu et al. |
| 6,501,732 B1 * | 12/2002 | Xu et al. ............ 370/235 |
| 6,502,144 B1 | 12/2002 | Accarie |
| 6,513,085 B1 | 1/2003 | Gugel et al. |
| 6,516,465 B1 | 2/2003 | Paskins |
| 6,519,657 B1 | 2/2003 | Stone et al. |
| 6,519,662 B2 | 2/2003 | Clapp et al. |
| 6,529,522 B1 | 3/2003 | Ito et al. |
| 6,574,588 B1 | 6/2003 | Shapiro et al. |
| 6,580,694 B1 | 6/2003 | Baker |
| 6,587,904 B1 | 7/2003 | Hauck et al. |
| 6,591,300 B1 | 7/2003 | Yurkovic |
| 6,606,320 B1 | 8/2003 | Nomura et al. |
| 6,618,750 B1 | 9/2003 | Staats |
| 6,618,785 B1 | 9/2003 | Whitby Streves |
| 6,621,832 B2 | 9/2003 | Staats |
| 6,628,607 B1 | 9/2003 | Hauck et al. |
| 6,631,426 B1 | 10/2003 | Staats |
| 6,636,914 B1 | 10/2003 | Teener |
| 6,639,918 B1 | 10/2003 | Hauck et al. |
| 6,643,714 B1 | 11/2003 | Chrysanthakopoulos |
| 6,671,768 B1 | 12/2003 | Brown |
| 6,686,838 B1 | 2/2004 | Rezvani et al. |
| 6,691,096 B1 | 2/2004 | Staats |
| 6,700,895 B1 | 3/2004 | Kroll |
| 6,711,574 B1 | 3/2004 | Todd et al. |
| 6,718,497 B1 | 4/2004 | Whitby Strevens |
| 2001/0001151 A1 | 5/2001 | Duckwall et al. |
| 2001/0019561 A1 | 9/2001 | Staats |

| | | | |
|---|---|---|---|
| 2001/0024423 | A1 | 9/2001 | Duckwall et al. |
| 2001/0040872 | A1* | 11/2001 | Haglund ................. 370/235 |
| 2002/0057655 | A1 | 5/2002 | Staats |
| 2002/0085581 | A1 | 7/2002 | Hauck et al. |
| 2002/0101231 | A1 | 8/2002 | Staats |
| 2002/0101885 | A1 | 8/2002 | Pogrebinsky et al. |
| 2002/0103947 | A1 | 8/2002 | Duckwall et al. |
| 2002/0105951 | A1* | 8/2002 | Hannuksela et al. ......... 370/389 |
| 2002/0120797 | A1 | 8/2002 | Fabre |
| 2002/0140851 | A1* | 10/2002 | Laksono ................. 370/229 |
| 2002/0172226 | A1 | 11/2002 | Staats |
| 2002/0188780 | A1 | 12/2002 | Duckwall |
| 2002/0188783 | A1 | 12/2002 | Duckwall et al. |
| 2002/0191116 | A1* | 12/2002 | Kessler et al. ............ 375/240.01 |
| 2003/0037158 | A1* | 2/2003 | Yano et al. ................. 709/232 |
| 2003/0037161 | A1 | 2/2003 | Duckwall et al. |
| 2003/0053416 | A1* | 3/2003 | Ribas-Corbera et al. ..... 370/233 |
| 2003/0055999 | A1 | 3/2003 | Duckwall et al. |
| 2003/0215017 | A1* | 11/2003 | Fang ..................... 375/240.25 |
| 2004/0037309 | A1 | 2/2004 | Hauck et al. |

OTHER PUBLICATIONS

"Information technology-Microprocessor systems—Control and Status Registers (CSR) Architecture for microcomputer buses", ANSI/IEEE Standard 1212, The Institute of Electrical and Electronics Engineers, Inc. pp. I-122, 1994 Edition.

Bregni et al., Jitter Testing Technique and Results at VC-4 Desynchronizer Output of SDH Equipment, IEEE Transactions on Instrumentation and Measurement, vol. 44, Issue 3, pp. 675-678, Jun. 1995.

"IEEE Standard for a High Performance Serial Bus", IEEE Standard 1394-1995, Institute of Electrical and Electronics Engineers, Inc., pp. I-384, approved Jul. 22, 1996.

Shiwen et al., Parallel Positive Justification in SDH C.sub.—4 Mapping, IEEE International Conference on Communications, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Information Technology-Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", Draft 3.0, Institute of Electrical and Electronics Engineers, Inc., pp. 1-187, Jun. 30, 1999.

"IEEE Standard for a High Performance Serial Bus-Amendment 1", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.

"IEEE Standard for a High Performance Serial Bus-Amendment 2", Institute of Electrical and Electronics Engineers, Inc., pp. 1-369, 2002, no month.

Supplementary European Search Report for European Patent Application No. 04 77 6494 dated Apr. 27, 2006, 3 pages.

* cited by examiner

Video Data, v210 (10 Bit Y/$C_b$/$C_r$)

| 31 | 24 | 16 | 8 | 0 | |
|---|---|---|---|---|---|
| X:X | $Cr_0$ | $Y_0$ | msb $Cb_0$ lsb | | 0 |
| X:X | $Y_2$ | $Cb_2$ | $Y_1$ | | 1 |
| X:X | $Cb_4$ | $Y_3$ | $Cr_2$ | | 2 |

FIG. 4A

Video Data, 2vuy (8 Bit Y/$C_b$/$C_r$)

| 31 | 24 | 16 | 8 | 0 | |
|---|---|---|---|---|---|
| $Y_1$ | $Cr_0$ | $Y_0$ | msb $Cb_0$ lsb | | 0 |
| $Y_3$ | $Cr_2$ | $Y_2$ | $Cb_2$ | | 1 |
| $Y_5$ | $Cr_4$ | $Y_4$ | $Cb_4$ | | 2 |

FIG. 4B

Audio Data (24 Bit, Packed)

| 31 | 24 | 16 | 8 | 0 | |
|---|---|---|---|---|---|
| Channel 2, Sample 0 lsb,msb | | Channel 1, Sample 0 | | lsb | 0 |
| Channel 3, Sample 0 | | lsb,msb Channel 2, Sample 0 | | | 1 |
| msb | Channel 4, Sample 0 | | lsb,msb Channel 3, Sample 0 | | 2 |
| Channel 6, Sample 0 lsb,msb | | Channel 5, Sample 0 | | lsb | 3 |
| Channel 7, Sample 0 | | lsb,msb Channel 6, Sample 0 | | | 4 |
| msb | Channel 8, Sample 0 | | lsb,msb Channel 7, Sample 0 | | 5 |
| Channel 2, Sample 1 lsb,msb | | Channel 1, Sample 1 | | lsb | 6 |
| Channel 3, Sample 1 | | lsb,msb Channel 2, Sample 1 | | | 7 |
| msb | Channel 4, Sample 1 | | lsb,msb Channel 3, Sample 1 | | 8 |

FIG. 5A

Audio Data (16 Bit)

| 31 | 24 | 16 | 8 | 0 | |
|---|---|---|---|---|---|
| msb | Channel 2, Sample 0 | lsb,msb | Channel 1, Sample 0 | lsb | 0 |
| | Channel 4, Sample 0 | | Channel 3, Sample 0 | | 1 |
| | Channel 6, Sample 0 | | Channel 5, Sample 0 | | 2 |
| | Channel 8, Sample 0 | | Channel 7, Sample 0 | | 3 |
| | Channel 2, Sample 1 | | Channel 1, Sample 1 | | 4 |

FIG. 5B

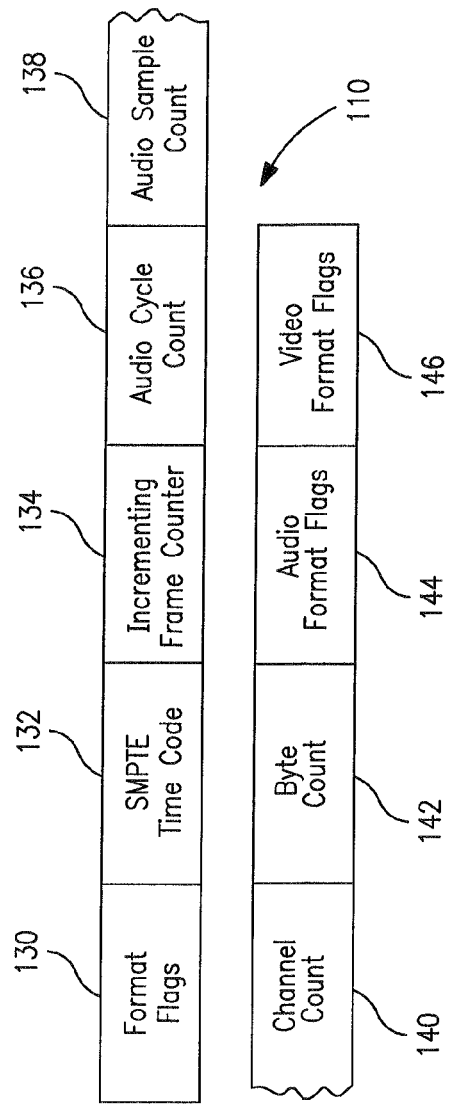

Register Memory Map

| Register Number | Register Name |
|---|---|
| 00 | GLOBAL CONTROL |
| 01 | GLOBAL STATUS |
| 02 | ISOCH CONTROL |
| 03 | FLOW CONTROL |
| 04 | ISOCH CHAN |

FIG. 11

A/V Global Registers

Global Control

| ID | Name | Field | BiT | Description |
|---|---|---|---|---|
| 00 | Global Control | Frame Rate | [2..0] | 000-Not Valid<br>001-60.00<br>010-59.94<br>011-30.00<br>100-29.97<br>101-25.00<br>110-24.00<br>111-23.98 |
| | | | [5..3] | Reserved |
| | | Frame Geometry | [9..6] | 0000-1920x1080<br>0001-1280x720<br>0010-720x486<br>0011-720x576<br>0110-648x486<br>0111-768x576 |
| | | | [12..10] | Reserved |
| | | Standard | [15..13] | 000-1080i<br>001-720p<br>010-480i<br>011-576i<br>100-1080p |
| | | | [18..16] | Reserved |
| | | Genlock | [20..19] | 00-Reference<br>01-Reserved<br>10-Reserved<br>11-Free Run |
| | | Reference Input Voltage | [21] | 0-1.0 Volt<br>1-4.0 Volts |
| | | Direction | [22] | 0-Capture<br>1-Playback |
| | | | [23] | Reserved |
| | | Reference Select | [24] | 0-Video Input<br>1-Analog ReferEnce Input |
| | | | [31..27] | Reserved |

FIG. 12

Global Status

| ID | Name | Field | Bit(s) | Description |
|----|------|-------|--------|-------------|
| 01 | Global Status Register | GenLock State | [0] | 0-No Lock<br>1-Locked |
| | | Video Input Present | [1] | 0-Input not present<br>1-Input present |
| | | | [3..2] | Reserved |
| | | Analog Audio Input1 Unbalanced | [4] | 0-Balanced audio on XLR<br>1-Unbalanced audio on phono plug |
| | | Analog Audio Input2 Unbalanced | [5] | 0-Balanced audio on XLR<br>1-Unbalanced audio on phono plug |
| | | Analog Audio Input3 Unbalanced | [6] | 0-Balanced audio on XLR<br>1-Unbalanced audio on phono plug |
| | | Analog Audio Input4 Unbalanced | [7] | 0-Balanced audio on XLR<br>1-Unbalanced audio on phono plug |
| | | Reserved | [15..8] | Reserved |
| | | Format Error | [16] | 0-Ok<br>1-Error |
| | | 1394 Error1 | [17] | 0-Ok<br>1-Error |
| | | A/V Sync Error1 | [18] | 0-Ok<br>1-Error |
| | | | [31..19] | Reserved |

Isoch Control

| ID | Name | Field | Bit(s) | Description |
|---|---|---|---|---|
| 02 | Isoch Control | Isoch Enable | [0] | 0 – Isoch Channel disabled<br>1 – Isoch Channel enabled |
| | | | [31..1] | Reserved |

FIG. 15

Flow Control

| ID | Name | Field | Bit(s) | Description |
|---|---|---|---|---|
| 03 | Isoch Flow Control | Playback Byte Drift | [31..0] | This unsigned value indicates the number of bytes between the read pointer and the write pointer during playback. A zero indicates that the interface has run out of data for playback. |

FIG. 16

Isoch Control

| ID | Name | Field | Bit(s) | Description |
|---|---|---|---|---|
| 04 | Isoch Channel | Isoch Channel | [5..0] | Isochronous channel number for A/V transmission |
| | | Isoch Speed | [8..6] | Isochronous channel speed |
| | | | [31..9] | Reserved |

SYNCHRONIZED TRANSMISSION OF AUDIO AND VIDEO DATA FROM A COMPUTER TO A CLIENT VIA AN INTERFACE

CROSS-REFERENCE TO RELATED APPLICATIONS

This application is a continuation of Ser. No. 10/746,283, filed Dec. 23, 2003 and claims priority to co-owned U.S. Pat. No. 7,353,284 entitled "Synchronized transmission of audio and video data from a computer to a client via an interface" issued Apr. 1, 2008 which claims priority to U.S. Provisional Patent Application Ser. No. 60/478,336 of the same title filed Jun. 13, 2003, each of the foregoing incorporated herein by reference in their entirety.

FIELD OF THE INVENTION

The present invention relates broadly to devices in communication over a network. Specifically, the present invention relates to data flow management between devices transmitting and receiving data at different transmission rates. More specifically, the present invention relates to controlling data flow through a buffer by monitoring the buffer and adjusting data transmission based on buffer conditions.

BACKGROUND OF THE INVENTION

A "bus" is a collection of signals interconnecting two or more electrical devices that permits one device to transmit information to one or more other devices. There are many different types of busses used in computers and computer-related products. Examples include the Peripheral Component Interconnect ("PCI") bus, the Industry Standard Architecture ("ISA") bus and Universal Serial Bus ("USB"), to name a few. The operation of a bus is usually defined by a standard which specifies various concerns such as the electrical characteristics of the bus, how data is to be transmitted over the bus, how requests for data are acknowledged, and the like. Using a bus to perform an activity, such as transmitting data, requesting data, etc., is generally called running a "cycle." Standardizing a bus protocol helps to ensure effective communication between devices connected to the bus, even if such devices are made by different manufacturers. Any company wishing to make and sell a device to be used on a particular bus, provides that device with an interface unique to the bus to which the device will connect. Designing a device to particular bus standard ensures that device will be able to communicate properly with all other devices connected to the same bus, even if such other devices are made by different manufacturers. Thus, for example, an internal fax/modem (ie., internal to a personal computer) designed for operation on a PCI bus will be able to transmit and receive data to and from other devices on the PCI bus, even if each device on the PCI bus is made by a different manufacturer.

Currently, there is a market push to incorporate various types of consumer electronic equipment with a bus interface that permits such equipment to be connected to other equipment with a corresponding bus interface. For example, digital cameras, digital video recorders, digital video disks ("DVDs"), printers are becoming available with an IEEE 1394 bus interface. The IEEE ("Institute of Electrical and Electronics Engineers") 1394 bus, for example, permits a digital camera to be connected to a printer or computer so that an image acquired by the camera can be printed on the printer or stored electronically in the computer. Further, digital televisions can be coupled to a computer or computer network via an IEEE 1394 bus.

However, many devices exist without any sort of IEEE 1394 interface. This presents a problem as such devices are unable to be to be connected with other devices as described above. There is a heartfelt need to overcome this problem to provide connectivity to devices that otherwise cannot be connected to a IEEE 1394 bus.

SUMMARY OF THE INVENTION

In one aspect of the invention, controlling the transmission of data from a computer to a video client via an interface device that buffers the data frames sent and communicates to the computer and the video client using different protocols is disclosed. In an embodiment, the present invention provides a method of performing data transmission flow control by polling the interface a first time to determine the size of the buffer on the interface; receiving a first buffer size value from the interface; sending a plurality of frames of video and audio data to the buffer on the interface such that a delay period exists between the sending of each frame; polling the interface a second time to determine buffer size after the frames are sent to the interface; and receiving a second buffer size value from the interface. If the second buffer size value is larger than the optimal size, and larger than the first buffer size value, then the delay period between transmission of frames from the computer to the interface is increased.

In another embodiment, the present invention provides a method of performing data transmission flow control, by polling the interface a first time to determine the size of the buffer on the interface; receiving a first buffer size value from the interface; sending a plurality of frames of video and audio data to the buffer on the interface such that a delay period exists between the sending of each frame; polling the interface a second time to determine buffer size after the frames are sent to the interface; and receiving a second buffer size value from the interface.

If the second buffer size value is smaller than optimal size, and smaller than the first buffer size value, then the delay period between transmission of frames from the computer to the interface is decreased.

In a second aspect of the invention, a method of performing data transmission flow control is disclosed for use in a system having a computer, a video client, and an interface coupled between the computer and the video client, the interface having a buffer adapted to store data frames received from the computer to be sent to the video client. In one embodiment, the method comprises determining a first buffer fill amount of the buffer; sending frames of data in an isochronous manner to the buffer via the interface such that a number of cycles exists between the sending of at least a portion of the frames; determining a second buffer fill amount after the are sent to the buffer on the interface; and changing the number of cycles between transmission of frames from the computer to the buffer on the interface based in part on the relative size of the second buffer fill amount as compared with the first buffer fill amount.

In a third aspect of the invention, a computer readable apparatus that performs data transmission flow control is disclosed. In one embodiment, the computer readable apparatus has a storage medium containing instructions which, when executed by a computer: polls an interface buffer in communication with the computer to determine a first buffer fill amount, the buffer storing a number of data frames received from the computer, the buffer having a fill amount that varies with the number of data frames contained in the buffer; sends the number of data frames in an isochronous manner to the buffer of the interface such that a number of cycles exists between the sending of at least some of the frames; polls the interface to determine a second buffer fill amount, the polling to determine the second buffer fill amount occurring after the number of data frames are sent to the buffer; and modulates the number of cycles between frames in a subsequent transmission from the computer to the buffer based at least in part on the relative size of the second buffer fill amount as compared with the first buffer fill amount.

In a fourth aspect of the invention, an apparatus for performing data transmission flow control is disclosed. In one embodiment, the apparatus includes first apparatus adapted to determine a first buffer fill amount of the buffer on an interface at a first time; second apparatus adapted to send frames of data in an isochronous manner to the buffer on the interface such that a delay period exists between the sending of at least a portion of the plurality of frames; third apparatus adapted to determine a second buffer fill amount after the frames are sent to the buffer on the interface; and where if the second buffer fill amount value is smaller than an optimal buffer fill amount value, and smaller than the first buffer fill amount value, the second apparatus decreases the delay period, and if the second buffer fill amount value is larger than the optimal buffer fill amount value, and larger than the first buffer fill amount value, the second apparatus increases the delay period.

Many other features and advantages of the present invention will be realized by reading the following detailed description, when considered in conjunction with the accompanying drawings, in which:

BRIEF DESCRIPTION OF THE DRAWINGS

FIGS. 4A and 4B illustrate the organization of video data within data packets in accordance with the embodiments of the present invention;

FIGS. 5A and 5B illustrate the organization of audio data within data packets in accordance with the embodiments of the present invention;

FIGS. 6 and 7 illustrate elements of a header included in the frame in accordance with embodiments of the present invention;

FIG. 11 illustrates the register memory map for the interface device in accordance with embodiments of the present invention;

FIG. 12 illustrates organization of A/V global registers contained within the interface of the present invention;

FIG. 13 illustrates organization of global status registers contained within the interface device of the present invention;

FIG. 14 illustrates the isochronous control register contained in the interface device of the present invention;

FIG. 15 illustrates the organization of the flow control register contained in the interface device of the present invention; and FIG. 16 illustrates the organization of the isochronous channel register contained in the interface device of the present invention.

DETAILED DESCRIPTION

Figure 1:
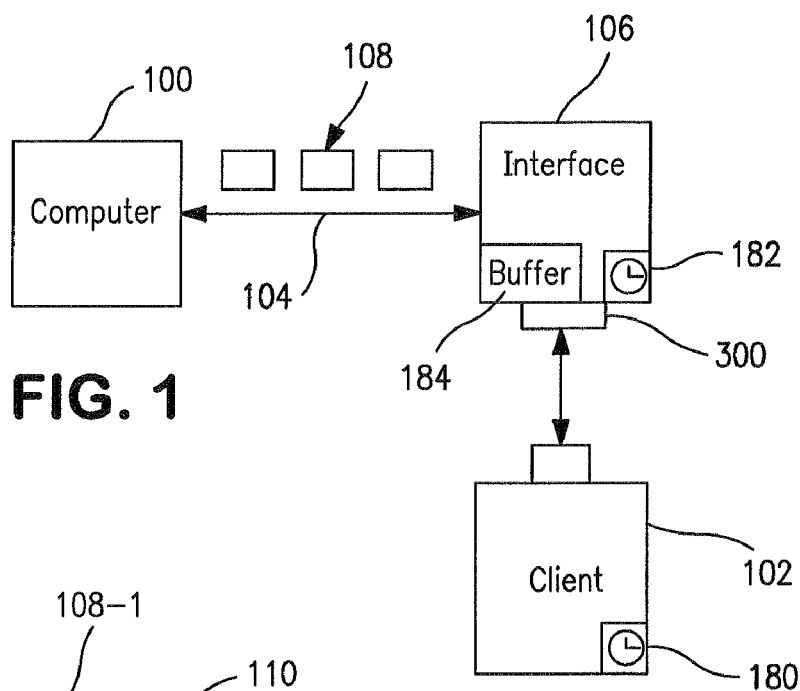
FIG. 1 illustrates in block diagram form major components used in connection with embodiments of the present invention.

Directing attention to FIG. 1, there is shown in block diagram form components connected to transmit audio and video data between a computer 100 and client 102, connected by bus 104 to interface 106. Computer 100 in the preferred embodiment is a computing device capable of processing and video and audio data and displaying it in a recognizable form to a user. Such devices include desktop, laptop, and palmtop computers. Client 102 as referred to herein is a video consumer or video producer, and includes such devices as digital cameras, and video storage devices, such as linear and random access devices. Bus 104, as referred to herein, includes a physical connection between computer 100 and interface 106, as well as the serial protocol adhered to by devices communicating over bus 104. In the preferred embodiment, bus 104 utilizes the IEEE 1394 serial bus protocol known as Firewire. Interface 106 accepts from client 102 both analog and digital inputs, and converts the input to scanned lines that can be used by an audio/video player executed on computer 100. In an alternative embodiment, interface 106 accepts from client 102 a digital compressed/uncompressed signal and transmits the entire signal or subsets of that signal. In an embodiment, interface 106 divides the input into frames 108 them over bus 104 to computer 100.

Figure 2:
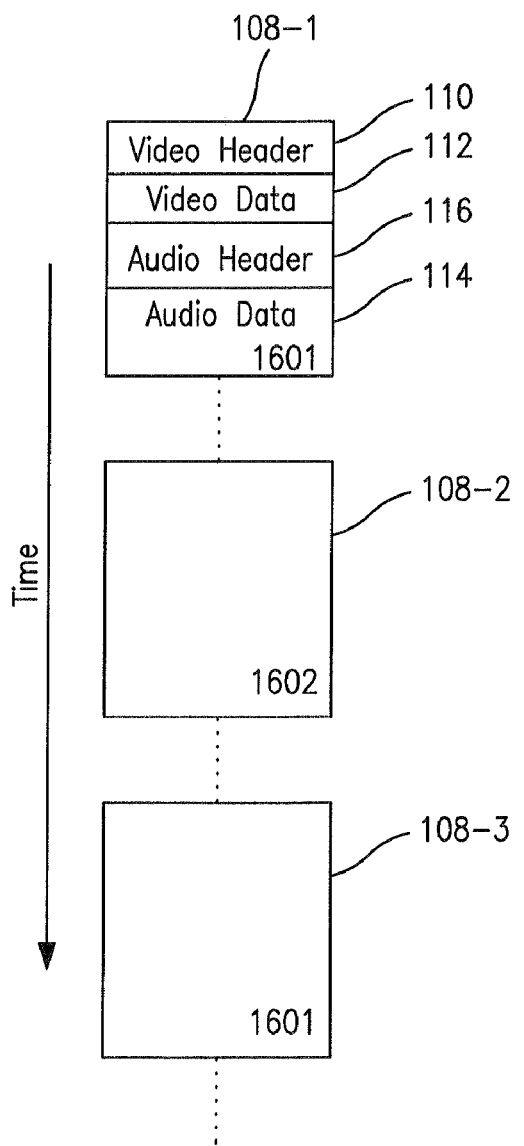
FIG. 2 illustrates the format of a frame in accordance with embodiments of the present invention.

The format of frame 108 is illustrated in FIG. 2. Frame 108 includes a frame header 110, video block 112, audio block 114, and optionally an audio header 116. Audio data in audio block 114 is sampled with respect to the video data in video block 112. The audio sample count per frame varies in accordance with the number defined in the ANSI/SMPTE 272M specification, incorporated herein by reference in its entirety. The audio sample count cadence is necessary to divide the integer number of samples per second across the NTSC frame rate (29.97 fps). Similarly, the size of frame 108 can vary to accommodate various video formats such as PAL or NTSC, and 8 or 10 bit video data, and audio formats such as 48 Khz and 96 Khz 16 and 24 bit etc. Similarly, the frame size of compressed data can vary to accommodate the compressed format. In an embodiment, video block 112 and audio block or compressed block are of a predetermined size, to make parsing frame 108 simple and requiring little processing overhead by applications such as direct memory access programs. In the event that not all of video block 112 or audio block 114 is not completely full of data, the remaining portions of blocks 112, 114 can be filled with zeros. In one embodiment, data contained in video block 112 and audio block 114 is not compressed, further reducing processing overhead on interface 106, as well as processing overhead required by decompression programs running on computer 100.

Interface 106, upon converting the input received from client 102 and converting it to scan lines and organizing it into frames 108, sends a frame at each vertical blanking interval to provide synchronization with computer 100. Computer 100 can derive the vertical blanking interval from the frequency of frames received and synchronize itself with the audio and video data of the incoming frames 108 received from interface 106. In this manner, processing resources are preserved, as there is no need to perform synchronization on each frame as it is received, thus providing higher quality performance of audio and video display on computer 100.

Figure 3A:
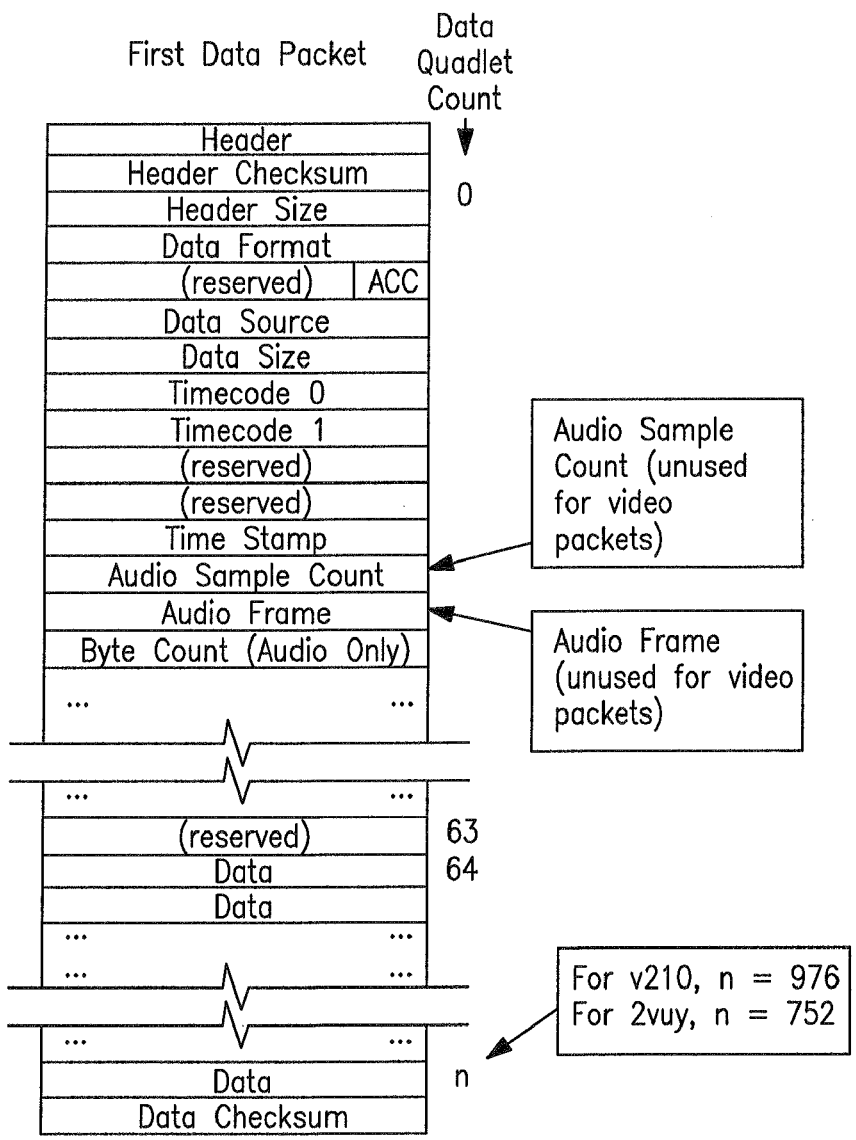
FIGS. 3A and 3B illustrate the format of the first data packet and following data packet, respectively.
Figure 3B:
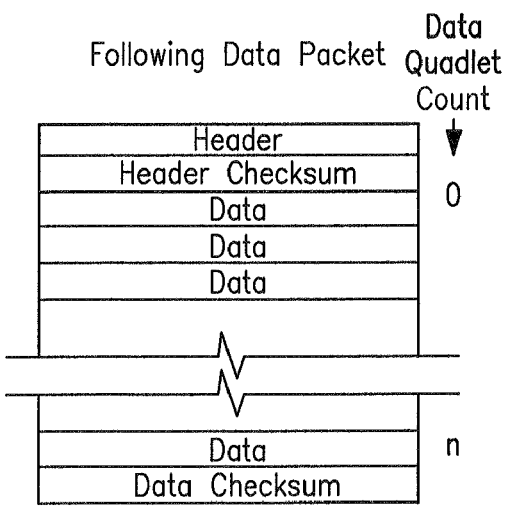

FIGS. 3A and 3B illustrate the format of the first data packet and following data packet, respectively.

FIGS. 4A and 4B illustrate the organization of video data within data packets. FIGS. 5A and 5B illustrate the organization of audio data within data packets.

FIG. 6 illustrates the contents of frame header 110. Included are format flags 130, which indicate how many bits per sample, SMPTE time code 132, incrementing frame counter 134, audio cycle count 136, audio sample count 138, channel count 140, block size byte count 142, audio format flags 144, and video format flags 146. Audio sample count 138 indicates a number of samples, which is in accordance with a cadence. The value in audio cycle count 136 indicates location within the cadence. A cadence of frames form a cycling pattern. In an alternative embodiment, some of the contents of frame header 110 can be moved or copied to optional audio header 116. An alternative view of frame header 110 is shown in FIG. 7, showing byte count, data length, and a frame bit.

Figure 8:
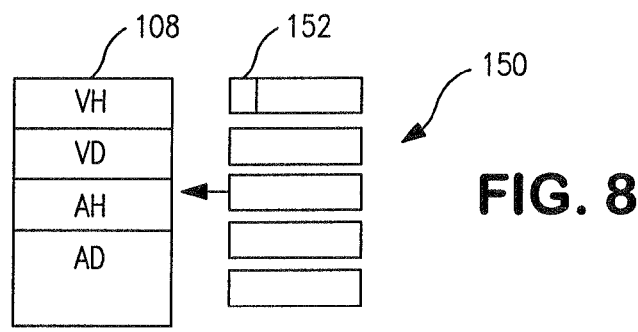
FIG. 8 illustrates a collection of packets that combine to form a frame in accordance with embodiments of the present invention.

As illustrated in FIG. 8, frame 108 is constructed from a plurality of packets 150 of a predetermined size. Associated with each packet is an 1394 isochronous packet header. Data transmission in accordance with the present invention takes advantage of a synchronization bit to find the beginning of a frame. The first packet in frame 108 is marked with the synchronization bit. This allows the stream of data to be identified by computer 100 as it is received, further reducing processing overhead by allowing computer 100 to synchronize the flow of frames received from interface 106.

In an alternative embodiment of the present invention, frames adhering to the serial digital interface (SDI) standard can be utilized as illustrated in FIGS. 9A through 9E. In these embodiments, bus 104 adheres to the IEEE 1394B serial bus protocol to accommodate data rate restrictions set forth by the SDI standard. As described above, interface 106 forms frames from received input by creating scanned lines, performing deinterlacing, packetizing, and creating fixed-size SDTI frames of audio and video data. Various modifications can be made to SDTI frames, depending on the processing resources available on computer 100, interface 106, client 102, or other device. As described above, the transmission of SDTI frames sent over bus 104 are synchronized to the vertical blanking interval of the accepted signal.

Figure 9A:
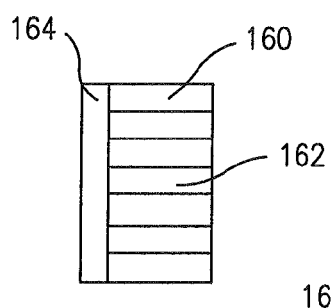
FIGS. 9A-9D illustrates an alternative embodiment of the present invention in which variations of SDTI frames are used in accordance with embodiments of the present invention.
Figure 9B:
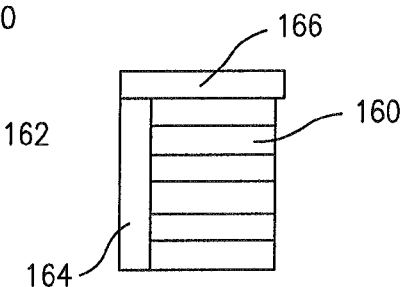
Figure 9C:
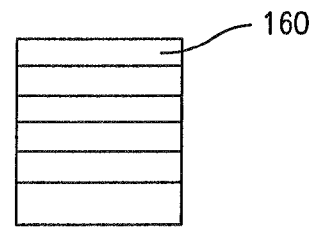
Figure 9D:
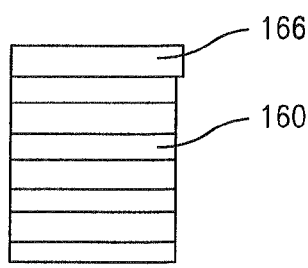
Figure 9E:
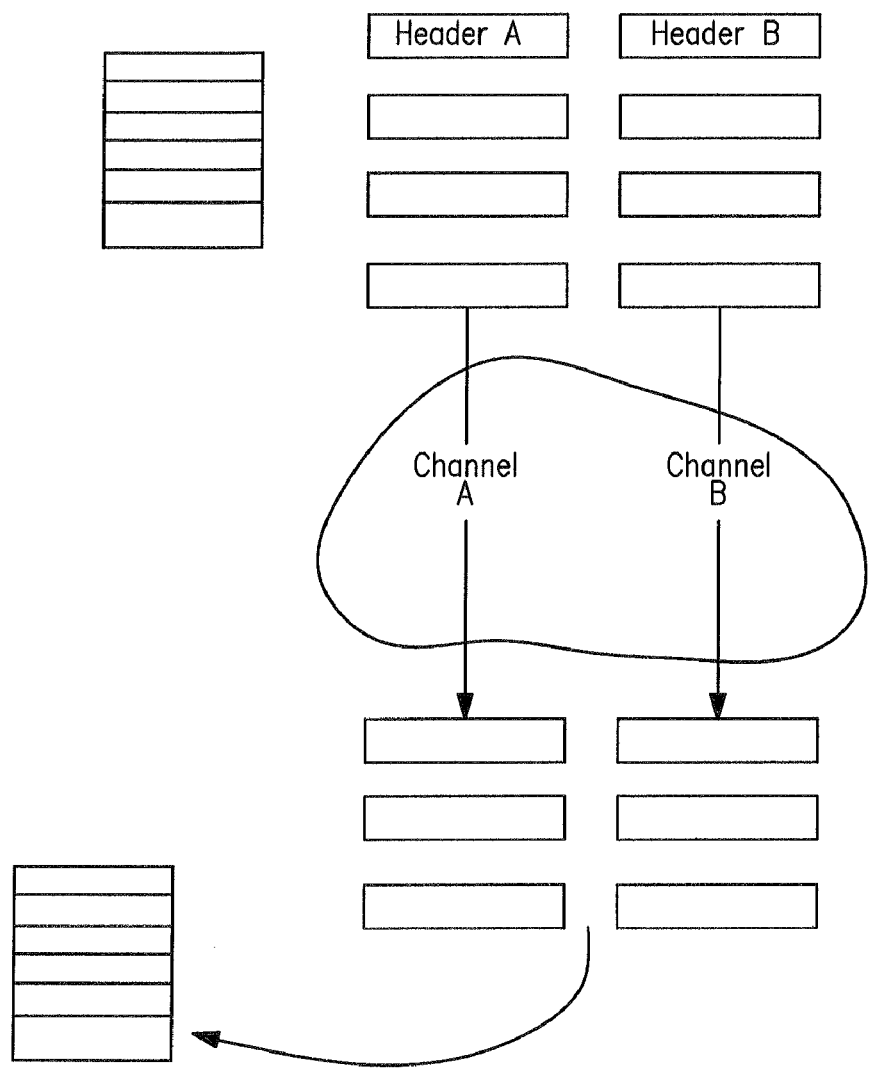
FIG. 9E illustrates an alternative embodiment in which the transmitter divides the SDTI stream across multiple channels.

As shown in FIG. 9A, SDTI frame 160 generally has two components: vertical blanking portion 162 and horizontal retrace 164. Alternatively, in another embodiment (FIG. 9B), SDI frame header 166, a header having a synchronization bit and a frame count, is added to SDTI frame 160 for further synchronization and fault detection purposes, such as recovering from data lost in transmission or the occurrence of a bus reset. In this embodiment, a frame count synchronization bit is included in SDTI frame header 166 and SDTI frame header 166 is synchronized with vertical blanking portion 162. For example, in an application where interface 106 is unable to read compressed data, or excessive upgrades to interface 106 would be required, SDTI frame 160 can be transmitted to computer 100, where processing on the SDTI stream is performed by software in a non-realtime manner. Alternatively, as shown in FIG. 9C, SDTI frame 160 can be constructed without horizontal retrace 164 to further reduce processing overhead. An SDTI frame constructed without a horizontal retrace but having header 166, can also be utilized in an embodiment, as shown in FIG. 9D. In yet another embodiment, as shown in FIG. 9E, the SDTI frame can be split between multiple channels and also include SDTI frame header 166. In this embodiment, the transmitter splits the SDTI stream in half, with half of the lines being transmitted across channel A, the other half being transmitted across channel B. An attached header for each partial frame can be used to assist in re-combining frame data.

Figure 10:
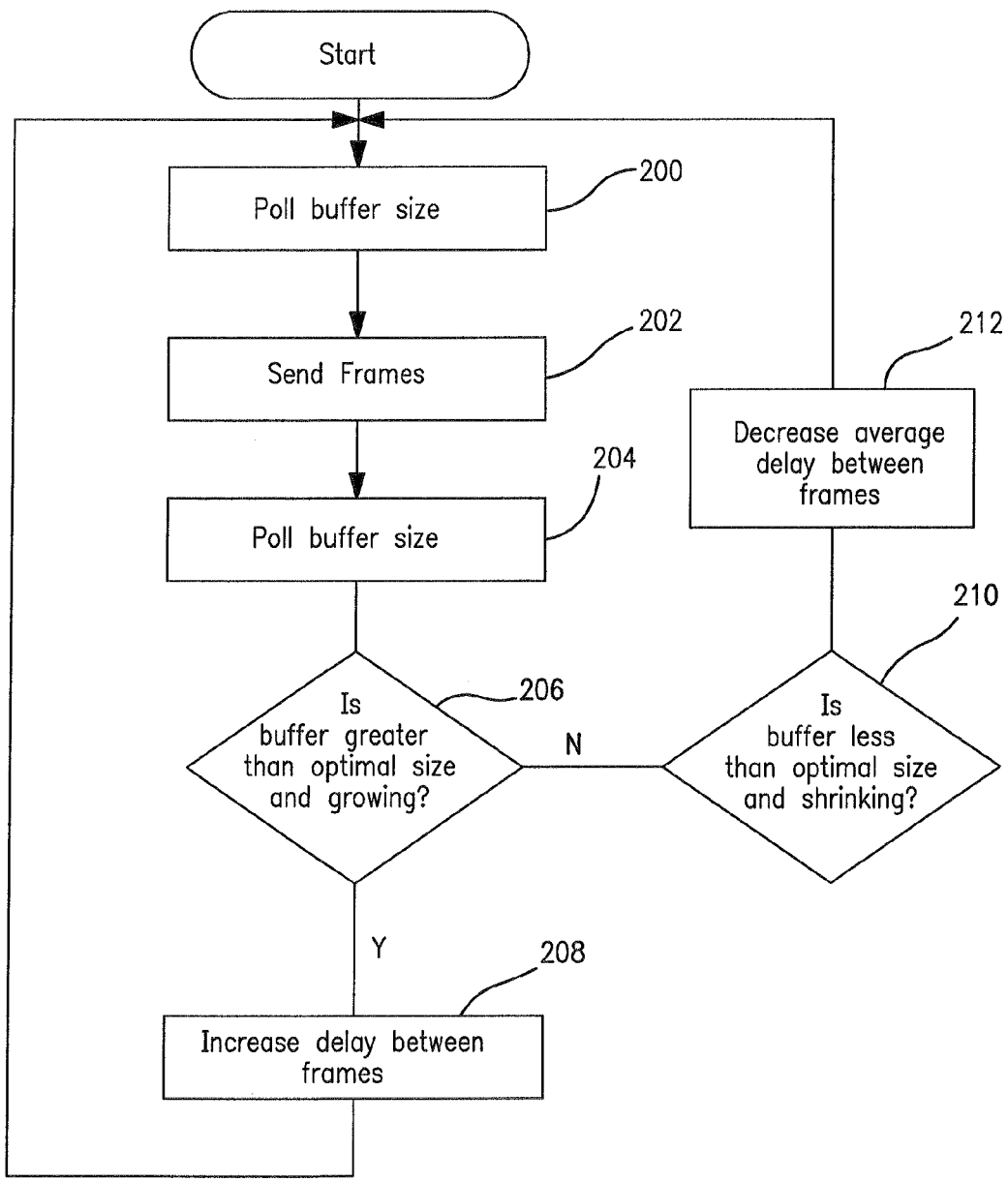
FIG. 10 illustrates in flow chart form acts performed to provide external clocking between a computer and a hardware interface in accordance with embodiments of the present invention.

In another aspect of the present invention, external clocking can be utilized to synchronize data transmission between computer 100, interface 106 and client 102. In an embodiment, client 102 includes a high-quality reference clock 180 (FIG. 1) that can be used to synchronize clock 182 on interface 106 and prevent overflow of buffer 184 on interface 106. In this embodiment, the value of reference clock 180 on client 102 is derived on interface 106 from the frequency at which data is transmitted from computer 102 to interface 106. To perform flow control, cycles are skipped between transmission of frames. A skipped cycle increases the amount of time between transmissions of frames, to slow the data rate of the frame transmission. Directing attention to FIG. 10, at reference numeral 200, computer polls interface 106 to read the size of buffer 184. While for exemplary purposes the buffer is referred to in terms such as "bigger" and "smaller," it is to be understood that in the case of a fixed-size buffer bigger and smaller refer to fullness of the buffer. At reference numeral 202, computer 100 then sends a plurality of frames to interface 106. At reference numeral 204, computer 100 again polls interface 106 to determine the size of buffer 184. If buffer 184 has grown in size from the last poll of its size (decision reference numeral 206), control proceeds to reference numeral 208, where computer 100 increases the delay between frames it is sending to interface 106. In an embodiment, the delay between frames sent is 125 milliseconds. In another embodiment a fractional delay is attained by modulating the delay over a number of frames. For instance if a delay between frames of 2.5 times 1.25 microseconds is required, alternating frame delays of 2 and 3 cycles (of 125 microseconds) are interspersed. Control then returns to reference numeral 202, where the frames are sent to interface 106 with the additional delay between frames. However, returning to decision reference numeral 206, if buffer 184 has not grown in size since the last polling of its size, control transitions to decision reference numeral 210. At decision reference numeral 210, if buffer 206 has decreased in size, control transitions to reference numeral 212, where the delay between frames sent from computer 100 to interface 106 is decreased. In an embodiment, the amount of this decrease is also 125 Ms. Control then transitions to reference numeral 202, where the frames are sent from computer 100 to interface 106 with the reduced delay between frames. Returning to decision reference numeral 210, if the size of buffer 184 has not reduced since the last polling of the size of buffer 184, then no adjustment to the delay between frames is necessary, and control transitions to reference numeral 202.

Interface 106 includes a serial unit 300 for enabling communication across bus 104. Serial unit 300 includes a unit directory 302 as shown in Table 1.

TABLE 1

| Name | Key | Value |
| --- | --- | --- |
| Unit_Spec_ID | 0x12 | 0x000a27 |
| Unit_SW_Version | 0x13 | 0x000022 |
| Unit_Register_Location | 0x54 | Csr_offset to registers |
| Unit_Signals_Supported | 0x55 | Supported RS232 signals |

The Unit_Spec_ID value specifies the organization responsible for the architectural definition of serial unit 300. The Unit_SW_Version value, in combination with Unit_Spec_ID value, specifies the software interface of the unit. The Unit_Register_location value specifies the offset in the target device's initial address space of the serial unit registers. The Unit_Signals_Supported value specifies which RS-232 signals are supported, as shown in the Table 2. If this entry is omitted from the serial unit directory 302, then none of these signals are supported.

TABLE 2

| Field | Bit | Description |
| --- | --- | --- |
| Ready to Send (RTS) | 0 | Set if RTS/RFR is supported |
| Clear to Send (CTS) | 1 | Set if CTS is supported |
| Data Set ready (DSR) | 2 | Set if DSR is supported |
| Data Transmit Ready (DTR) | 3 | Set if DTR is supported |
| Ring Indicator (RI) | 4 | Set if RI supported |
| Carrier (CAR) | 5 | Set if CAR/DCD is supported |
| Reserved | [31 . . . 6] | Reserved |

Also included in serial unit 300 is a serial unit register map 304 that references registers contained in serial unit 300. The organization of serial unit register map 304 is shown in Table 3.

TABLE 3

| Hex Offset | Name | Access | Size(quads) | Value |
| --- | --- | --- | --- | --- |
| 0x0 | Login | W | 2 | Address of initiator's serial registers |
| 0x8 | Logout | W | 1 | Any value |
| 0xc | Reconnect | W | 1 | Initiator's node ID |
| 0x10 | TxFIFO Size | R | 1 | Size in bytes of Tx FIFO |
| 0x14 | RxFIFO Size | R | 1 | Size in bytes of Rx FIFO |
| 0x18 | Status | R | 1 | CTS/DSR/RI/CAR |
| 0x1c | Control | W | 1 | DTR/RTS |
| 0x20 | Flush TxFIFO | W | 1 | Any value |
| 0x24 | Flush RxFIFO | W | 1 | Any value |
| 0x28 | Send Break | W | 1 | Any value |
| 0x2c | Set Baud Rate | W | 1 | Baud rate 300->230400 |
| 0x30 | Set Char Size | W | 1 | 7 or 8 bit characters |
| 0x34 | Set Stop Size | W | 1 | 1, 1.5 or 2 bits |
| 0x38 | Set Parity | W | 1 | None, odd or even parity |
| 0x3c | Set Flow Control | W | 1 | None, RTS/CTS or Xon/Xoff |
| 0x40 | Reserved | — | 4 | Reserved |
| 0x50 | Send Data | W | TxFIFO size | Bytes to transmit |

Serial unit register map 304 references a login register. A device attempting to communicate with serial unit 300, is referred to herein as an initiator. For example, an initiator can be computer 100, or other nodes connected on a network via a high-speed serial bus and in communication with interface 106. The initiator writes the 64 bit address of the base of its serial register map to the login register to log into serial unit 300. If another initiator is already logged in, serial unit 300 returns a conflict error response message. The high 32 bits of the address are written to the Login address, the lower 32 bits to Login+4. The serial unit register map also references a logout register. The initiator writes any value to this register to log out of the serial unit. After every bus reset the initiator must write its (possibly changed) nodeID to the reconnect register. If the initiator fails to do so within one second after the bus reset it is automatically logged out. The 16-bit nodeID is written to the bottom 16 bits of this register, the top 16 bits should be written as zero. A read of the TxFIFOSize register returns the size in bytes of the serial unit's transmit FIFO. A read of the RxFIFOSize register returns the size in bytes of serial unit 300's receive FIFO. A read of the status register returns the current state of CTS/DSR/RI/CAR (if supported). The status register is organized as shown in Table 4.

TABLE 4

| Field | Bit | Description |
| --- | --- | --- |
| CTS | 0 | 1 if CTS is high, else 0 |
| DSR | 1 | 1 if DSR is high, else 0 |
| RI | 2 | 1 if RI is high, else 0 |
| CAR | 3 | 1 if CAR is high, else 0 |
| Reserved | [31 . . . 4] | Always 0 |

A write to the control register sets the state of DTR and RTS (if supported). The organization of the control register is shown in Table 5.

TABLE 5

| Field | Bit | Description |
| --- | --- | --- |
| RTS | 0 | If 1 set RTS high, else set RTS low |
| DTR | 1 | If 1 set DTR high, else set DTR low |
| Reserved | [31 . . . 2] | Always 0 |

A write of any value to the FlushTxFIFO register causes serial unit 300 to flush its transmit FIFO, discarding any bytes currently in it. A write of any value to the FlushRxFIFO register causes the serial unit to flush its receive FIFO, discarding any bytes currently in it. A write of any value to the send break register causes serial unit 300 to set a break condition on its serial port, after transmitting the current contents of the TxFIFO. A write to the set baud rate register sets serial unit 300's serial port's baud rate. The set baud rate register is organized as shown in Table 6.

TABLE 6

| Value written | Baud Rate |
| --- | --- |
| 0 | 300 |
| 1 | 600 |
| 2 | 1200 |
| 3 | 2400 |
| 4 | 4800 |
| 5 | 9600 |
| 6 | 19200 |
| 7 | 38400 |
| 8 | 57600 |
| 9 | 115200 |
| 10 | 230400 |

The set char size register sets the bit size of the characters sent and received. The organization of the set char size register is shown in Table 7. 7 bit characters are padded to 8 bits by adding a pad bit as the most significant bit.

TABLE 7

| Value written | Character bit size |
|---|---|
| 0 | 7 bits |
| 1 | 8 bits |

The set stop size register designates the number of stop bits. The set stop size register is organized as shown in Table 8.

TABLE 8

| Value written | Stop bits |
|---|---|
| 0 | 1 bit |
| 1 | 1.5 bits |
| 2 | 2 bits |

The set parity register sets the serial port parity. The organization of the set parity register is shown in Table 9.

TABLE 9

| Value written | Parity |
|---|---|
| 0 | No Parity bit |
| 1 | Even parity |
| 2 | Odd parity |

The set flow control register sets the type of flow control used by the serial port. The organization of the set flow register is shown in Table 10.

TABLE 10

| Value written | Flow Control |
|---|---|
| 0 | None |
| 1 | CTS/RTS |
| 2 | XOn/Xoff |

The send data register is used when the initiator sends block write requests to this register to write characters into the transmit FIFO. Block writes must not be larger than the transmit FIFO size specified by the TxFIFOSize register. If there isn't enough room in the Tx FIFO for the whole block write, then a conflict error response message is returned and no characters are copied into the FIFO.

Also included in serial unit 300 is an initiator register map having a plurality of registers, organized as shown in Table 11.

TABLE 11

| Hex Offset | Name | Access | Size (quads) | Value |
|---|---|---|---|---|
| 0x0 | Break | W | 1 | Any value |
| 0x4 | Framing Error | W | 1 | Received character |
| 0x8 | Parity Error | W | 1 | Received character |
| 0xc | RxFIFO overflow | W | 1 | Any value |
| 0x10 | Status change | W | 1 | CTS/DSR/RI/CAR |
| 0x14 | Reserved | — | 3 | Reserved |
| 0x20 | Received Data | W | RxFIFO size | Bytes received |

When serial unit 300 detects a break condition on its serial port, it writes an arbitrary value to this register. When serial unit 300 detects a framing error on its serial port, it writes the received character to the framing register. When serial unit 300 detects a parity error on its serial port, it writes the received character to the parity error register. When serial unit 300's receive FIFO overflows, serial unit 300 writes an arbitrary value to the RxFIFO overflow register. When serial unit 300 detects a change in state of any of CTS/DSR/RI/CAR it writes to the status change register indicating the new serial port signal state. The organization of the status register is shown in table 12.

TABLE 12

| Field | Bit | Description |
|---|---|---|
| CTS | 0 | 1 if CTS is high, else 0 |
| DSR | 1 | 1 if DSR is high, else 0 |
| RI | 2 | 1 if RI is high, else 0 |
| CAR | 3 | 1 if CAR is high, else 0 |
| Reserved | [31 ... 4] | Always 0 |

When serial unit 300 receives characters from its serial port it writes the received characters to the received data register with a block write transaction. It never writes more bytes than the receive FIFO size specified by the RxFIFOSize register. If the initiator cannot receive all the characters sent it responds with a conflict error response message and receives none of the characters sent.

FIG. 11 illustrates the register memory map for the interface device in accordance with embodiments of the present invention. FIG. 12 illustrates organization of A/V global registers contained within the interface of the present invention. FIG. 13 illustrates organization of global status registers contained within the interface device of the present invention. FIG. 14 illustrates the isochronous control register contained in the interface device of the present invention. FIG. 15 illustrates the organization of the flow control register contained in the interface device of the present invention. FIG. 16 illustrates the organization of the isochronous channel register contained in the interface device of the present invention.

In another embodiment of the present invention, a synthesized vertical blanking signal is derived by polling a vertical blanking register on interface 106. The vertical blanking signal invokes code to programs running on computer 100. In an embodiment, timing information may also be provided to programs running on computer 100, either in combination with the invoked code or instead of the invoked code. In an embodiment of the invention, interface 106 contains a register that holds a counter indicating current progress in the frame, from which the next vertical retrace can be extrapolated or otherwise derived. By deriving boundaries on frame transmission, other data that is within the frame and synchronized to the occurrence of a vertical blanking interval can be located and accessed, such as for sampling operations. Additionally, an embodiment of the present invention derives frame boundaries for locating data that is coincident with the vertical blanking interval but includes no information about the vertical blanking In an embodiment, the present invention is used to obtain data that is valid for a period after the occurrence of a video blanking interval, such as a time code contained within the frame, can be read, and used in various processing applications. In an embodiment, computer 100 can then schedule an interrupt to fire at this extrapolated time, thus sending out a frame.

What is claimed is:

1. In a system having a computer, a video client, and an interface coupled between the computer and the video client, the interface having a buffer adapted to store data frames received from the computer to be sent to the video client, a method of performing data transmission flow control, the method comprising:

determining a first buffer fill amount of the buffer;

sending a plurality of frames of data in an isochronous manner to the buffer via the interface such that a number of cycles exists between the sending of at least a portion of said plurality of frames;

determining a second buffer fill amount after the plurality of frames are sent to the buffer on the interface; and changing the number of cycles between transmission of frames from the computer to the buffer on the interface based in part on the relative size of the second buffer fill amount as compared with the first buffer fill amount.

2. The method of claim 1, wherein the size of at least one frame of said plurality of frames varies to accommodate various video formats.

3. The method of claim 1, wherein each frame of said plurality of frames comprises a NTSC format frame.

4. The method of claim 1, wherein each frame of said plurality of frames comprises a PAL format frame.

5. The method of claim 1, wherein a video portion and an audio portion of each frame of said plurality of frames are of a predetermined size.

6. The method of claim 5, wherein any empty portions of the video portion and the audio portion of each frame in said plurality of frames are filled with zeros.

7. The method of claim 1, wherein said number of cycles existing between the sending of at least a portion of said plurality of frames is based in part on the first buffer fill amount.

8. The method of claim 1, wherein said number of cycles existing between the sending of at least a portion of said plurality of frames is based in part on the difference between the first buffer fill amount and the second buffer fill amount.

9. A computer readable apparatus that performs data transmission flow control, said computer readable apparatus having a storage medium containing instructions which, when executed by a computer:

polls an interface buffer in communication with the computer to determine a first buffer fill amount, the buffer storing a number of data frames received from the computer, the buffer having a fill amount that varies with the number of data frames contained in the buffer;

sends the number of data frames in an isochronous manner to the buffer of the interface such that a number of cycles exists between the sending of at least some of the frames;

polls the interface to determine a second buffer fill amount, said polling to determine said second buffer fill amount occurring after the number of data frames are sent to the buffer; and modulates the number of cycles between frames in a subsequent transmission from the computer to the buffer based at least in part on the relative size of the second buffer fill amount as compared with the first buffer fill amount.

10. The computer readable apparatus of claim 9, wherein a video portion and an audio portion of each frame of said plurality of frames are of a predetermined size.

11. The computer readable apparatus of claim 10, wherein said modulation comprises insertion of one or more additional cycles between transmission of at least two sets of sequential frames.

12. The computer readable apparatus of claim 9, said modulation is based at least in part on the relative size of the second buffer fill amount as compared with the first buffer fill amount, and maintains said buffer level at approximately an optimal level.

13. The computer readable apparatus of claim 9, wherein said modulation is based at least in part on the relative size of the second buffer fill amount as compared with the first buffer fill amount, and prevents an overflow condition and an underflow condition within said buffer.

14. The computer readable apparatus of claim 9, wherein said interface is in data communication with said computer via a standardized bus utilizing a serialized protocol.

15. The computer readable apparatus of claim 9, wherein the size of each frame of said plurality of frames varies to accommodate various video formats.

16. In a system having a computer, a video client, and an interface coupled between the computer and video client that facilitates data transmission between the computer and the video client, the interface connected to the computer via a standardized bus, the interface having a buffer for storing data frames received from the computer to be sent to the video client, an apparatus for performing data transmission flow control, the apparatus comprising:

a first apparatus adapted to determine a first buffer fill amount of the buffer on the interface at a first time;

a second apparatus adapted to send a plurality of frames of data in an isochronous manner to the buffer on the interface such that a delay period exists between the sending of at least a portion of the plurality of frames;

a third apparatus adapted to determine a second buffer fill amount after the plurality of frames are sent to the buffer on the interface; and where if the second buffer fill amount value is smaller than an optimal buffer fill amount value, and smaller than the first buffer fill amount value, said second apparatus decreases the delay period, and if the second buffer fill amount value is larger than the optimal buffer fill amount value, and larger than the first buffer fill amount value, said second apparatus increases the delay period.

17. The apparatus for performing data transmission flow control of claim 16, wherein each frame of said plurality of frames comprises a NTSC format frame.

18. The apparatus for performing data transmission flow control of claim 16, wherein the size of at least several frames of said plurality of frames varies to accommodate various video formats.

19. The apparatus for performing data transmission flow control of claim 18, wherein said interface receives signals from said video client and converts said signals into a second plurality of frames, and sends one frame from said second plurality of frames to said computer at each vertical blanking interval.

20. A device adapted for performing data transmission flow control, comprising:

a first apparatus adapted to determine a first buffer fill amount of a buffer on an interface between a computer and a video client;

a second apparatus adapted to send a plurality of frames of data in an isochronous manner to the buffer on the interface such that a delay period exists between the sending of each frame;

a third apparatus adapted to determine a second buffer fill amount of the buffer on the interface after the frames are sent to the buffer on the interface; and a fourth apparatus adapted to increase or decrease the delay period by a multiple of a fixed interval between the sending of frames to the buffer on the interface based at least in part on the relative size of the second buffer fill amount as compared with the first buffer fill amount.

21. The device of claim 20, wherein the size of at least one frame of said plurality of frames varies to accommodate various video formats.

22. The device of claim 20, wherein each frame of said plurality of frames comprises an NTSC format frame.

23. The device of claim 20, wherein each frame of said plurality of frames comprises a PAL format frame.

24. The device of claim 20, wherein a video portion and an audio portion of each frame of said plurality of frames are of a predetermined size.

25. The device of claim 24, wherein any empty portions of the video portion and the audio portion of each frame in said plurality of frames are filled with zeros.

26. The device of claim 20, wherein the interface is in data communication with the computer via a bus utilizing a serialized protocol.

27. A device adapted for performing data transmission flow control, comprising:
   a computer readable storage medium containing instructions which, when executed by a computer:
   determines a first buffer fill amount of a buffer on an interface between a computer and a video client, wherein the buffer on the interface facilitates data transmission between the computer and the video client;
   sends a plurality of frames of data in an isochronous manner to the buffer on the interface such that a delay period exists between the sending of at least some of the plurality of frames;
   determines a second buffer fill amount of the buffer on the interface after the plurality of frames are sent to the buffer on the interface; and
   modulates the delay period by a multiple of a fixed interval between transmission of individual ones of said frames from the computer to the buffer on the interface based in part on the relative size of the second buffer fill amount as compared with the first buffer fill amount.

28. The device of claim 27, wherein the size of at least one frame of said plurality of frames varies to accommodate various video formats.

29. The device of claim 27, wherein each frame of said plurality of frames comprises an NTSC format frame.

30. The device of claim 27, wherein each frame of said plurality of frames comprises a PAL format frame.

31. The device of claim 27, wherein a video portion and an audio portion of each frame of said plurality of frames are of a predetermined size.

32. The device of claim 27, wherein any empty portions of a video portion and an audio portion of each frame in said plurality of frames are filled with zeros.

33. The device of claim 27, wherein the interface is in data communication with the computer via a bus utilizing a serialized bus protocol.

34. A method of performing data transmission flow control, comprising:
   determining a first buffer fill amount value of a buffer on an interface between a computer and a video client, wherein the buffer on the interface facilitates data transmission between the computer and the video client;
   sending data in an isochronous manner to the buffer on the interface, said interface converting said data into a plurality of frames having a delay period between at least some of the frames;
   determining a second buffer fill amount value of the buffer on the interface; and
   if the second buffer fill amount value is smaller than an optimal buffer fill amount value, and smaller than the first buffer fill amount value, decreasing the delay period, and if the second buffer fill amount value is larger than the optimal buffer fill amount value, and larger than the first buffer fill amount value, increasing the delay period.

35. The method of claim 34, wherein the size of at least one frame of said plurality of frames varies to accommodate various video formats.

36. The method of claim 34, wherein each frame of said plurality of frames comprises an NTSC format frame.

37. The method of claim 34, wherein each frame of said plurality of frames comprises a PAL format frame.

38. The method of claim 34, wherein a video portion and an audio portion of each frame of said plurality of frames are of a predetermined size.

39. The method of claim 34, wherein any empty portions of a video portion or an audio portion of each frame in said plurality of frames are filled with zeros.

40. The method of claim 34, wherein the interface is in data communication with the computer via a bus utilizing a serialized bus protocol.

* * * * *